March 8, 1932.  C. L. MASTERS  1,848,962
ATTACHING MEANS
Filed Nov. 30, 1929
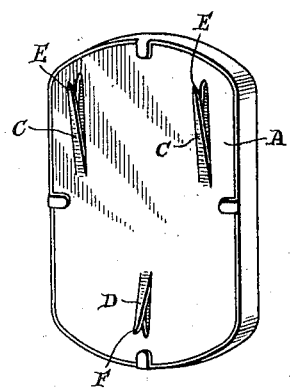
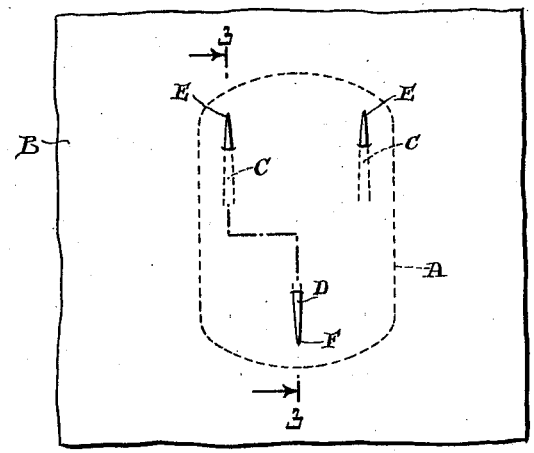
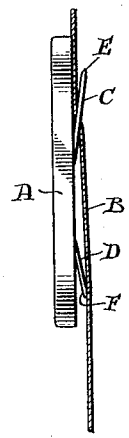
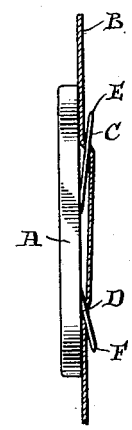
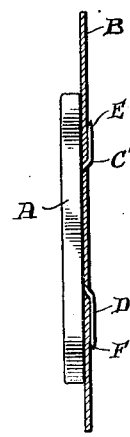
WITNESSES
INVENTOR
Carl L. Masters
BY
ATTORNEYS Patented Mar. 8, 1932

1,848,962

UNITED STATES PATENT OFFICE

CARL L. MASTERS, OF YONKERS, NEW YORK

ATTACHING MEANS

Application filed November 30, 1929. Serial No. 410,843.

This invention relates generally to a means for attaching various objects to a supporting surface, and comprehends more particularly an improved means for attaching to the upholstered surfaces of a motor vehicle, a device for maintaining a servicing record, such as set forth in my co-pending application Serial No. 294,556, filed July 21, 1928.

In its broad aspect, the invention comprehends an attaching means for securely attaching various articles or objects to a readily penetrable surface defining element, such as a cloth, fabric or the like.

More specifically, the invention comprehends an attaching means including a plurality of bendable prongs or tines projecting relatively in opposite directions and of relatively different lengths, whereby the longer initially inserted prongs are retained against complete withdrawal from the supporting element by the limited subsequent movement of the shorter prong or prongs.

The invention further resides in the provision of an attaching means which is extremely simple in its construction, which facilitates the attachment of the article, object or device to a supporting member and which effectually retains the article, object or device in its attached relation to a member.

With the above recited and other objects in view, reference is had to the following description and accompanying drawings, in which there is exhibited one example or embodiment of the invention, while the claims define the actual scope of the same.

In the drawings:

Figure 1 is a rear view of a device equipped with an attaching means constructed in accordance with the invention prior to the attachment of the device to a supporting member.

Figure 2 is a view illustrating the device in attached relation to a supporting member.

Figure 3 is a side view illustrating the initial step in applying the attaching means.

Figure 4 is a similar view illustrating the second step in effecting the attachment.

Figure 5 is a similar view illustrating the attaching means in fully attached condition.

Referring to the drawings by characters of reference, A designates a device which is designed to be attached to a supporting member B, which may be of any suitable readily penetrable or perforable material which must be slightly flexible. The device A carries one or more prongs or tines C, which are of relatively greater length than a similar tine or tines D and which tines C must of necessity project in an opposite direction to the tine or tines D. The tines C and D must of necessity be bendable and, in practice, said tines may be formed integral with or attached at one end to the device A. As illustrated, the tines C and D are formed integral by slitting the device A and striking up the tines or prongs therefrom, but it is to be clearly understood that this is merely illustrative of one manner in which the tines may be formed. It is also necessary that the tines C and D be properly spaced from each other to accomplish the ends of the invention, but, in practice, the free pointed terminals E of the tines C are not necessarily directed away from the end of the tines or prongs D which are attached to the device A. It is clearly apparent that the free pointed end F of the tine or prong D may be disposed in a reverse direction from that illustrated, while the free pointed terminals E of the tines C may be similarly reversed so long as the prongs C and D respectively project in an opposite direction.

In attaching the device A to the member B, the free pointed terminals E of the prongs or tines C are initially inserted in the member B, as illustrated in Figure 3 of the drawings, until the ends of the prongs or tines C which are connected with the device A function to limit the inserting operation. The free pointed terminal F of the prong or prongs D is then inserted by a reverse movement of the device A from the movement employed for inserting the prongs C. Due to the fact that the prong or prongs D are of lesser length than the prong or prongs C, it is apparent that the end of the prong or prongs D which is anchored to the device A will limit the movement of the device A in the opposite direction to a point where a portion of the prong or prongs C will still remain inserted in the member B, as clearly shown in Figure 4 of the drawings. The final operation in establishing the connection of the member A with the member B consists in pressing, deforming or permanently bending the prongs, as illustrated in Figure 5, to further initial holding of the device A in attached relation to the member B. Obviously, this may be accomplished by pressing directly inward on the device A against a solid backing over which the member B is arranged or, where there is no backing, a suitable instrument may be brought to bear against the ends of the prongs which extend through the member B. It will be further observed that the attaching means is preferably intended to form its own opening through which the prongs extend and that the attaching means is concealed from view by the device A. It is also to be taken into consideration that the prongs may be carried by a member to which a device is to be attached, and the device being attached will then receive the prongs instead of carrying the prongs.

What is claimed is:

1. An article adapted for attachment to a flexible penetrable support, said article having a metallic rear wall comprising portions slitted from said wall to provide oppositely projecting bendable prongs of relatively different lengths normally offset from the plane of the wall and adapted for engagement with the support by pressing the article against the support and sliding the same successively in the direction of the projection of the longer and shorter prongs respectively, and adapted to clampingly engage the support by exerting a final inward pressure on the article to bend the prongs into substantially the same plane with the rear wall.

2. An article adapted for attachment to a flexible penetrable support, said article including a metallic rear wall having slitted portions defining integral oppositely projecting bendable prongs of relatively different lengths normally offset from the plane of the wall to facilitate engagement with the support and adapted to be subsequently bent into substantially the same plane with said wall for clamping the support.

CARL L. MASTERS.